(12) United States Patent
Rose

(10) Patent No.: US 6,561,121 B1
(45) Date of Patent: May 13, 2003

(54) CONDITION DETECTING APPARATUS

(75) Inventor: Paul Stuart Rose, Knypersley Staffs (GB)

(73) Assignee: Roper Industries Limited, Suffolk (GB)

(*) Notice: Subject to any disclaimer, the term of this patent is extended or adjusted under 35 U.S.C. 154(b) by 0 days.

(21) Appl. No.: 09/856,103

(22) PCT Filed: Nov. 25, 1999

(86) PCT No.: PCT/GB99/03921

§ 371 (c)(1),
(2), (4) Date: May 15, 2001

(87) PCT Pub. No.: WO00/33042

PCT Pub. Date: Jun. 8, 2000

(30) Foreign Application Priority Data

| Nov. 28, 1998 | (GB) | ............................................. 9825990 |
| Jul. 6, 1999 | (GB) | ............................................. 9915659 |

(51) Int. Cl.$^7$ ................................................. G01K 1/14
(52) U.S. Cl. ..................................................... 116/216
(58) Field of Search ........................... 116/70, 216, 220, 116/221, 218, 101, 102, 103, 266, 270; 374/195, 201, 203, 187

(56) References Cited

U.S. PATENT DOCUMENTS

| 1,165,934 A | * | 12/1915 | Amthor | ....................... 116/221 |
| 3,882,479 A | * | 5/1975 | Szeverenyi | .................. 337/324 |
| 4,152,998 A | | 5/1979 | Taylor | |
| 4,406,169 A | | 9/1983 | Ikeuchi et al. | |
| 5,183,204 A | * | 2/1993 | Kelly et al. | .................. 116/216 |

FOREIGN PATENT DOCUMENTS

| DE | 34 25 350 | 1/1986 |
| EP | 0 235 627 | 9/1987 |
| GB | 2 091 464 | 7/1982 |
| GB | 2 155 678 | 9/1985 |

* cited by examiner

Primary Examiner—Christopher W. Fulton
Assistant Examiner—Tania C. Courson
(74) Attorney, Agent, or Firm—Smith-Hill and Bedell

(57) ABSTRACT

An apparatus (10) for determining a change in a condition in an item, and in particular overheating of a big end bearing (120). The apparatus (10) comprising a thermally reactive means (14) mountable on the big end bearing (120) and arranged to react to a temperature change so as, to move to a detectable position such that at the respective part of the stroke it can be sensed by a fixed proximity sensor (20) located spaced from the bearing (120), to activate an alarm.

27 Claims, 2 Drawing Sheets

CONDITION DETECTING APPARATUS

This invention relates to apparatus for detecting changes in conditions; particularly but not exclusively to apparatus for determining temperature and/or pressure changes; and especially changes in conditions in items, and for example in big end bearings for internal combustion engines.

In an internal combustion engine, problems can be encountered with the big end bearing overheating which can lead to the engine seizing up. This may occur due to low oil pressure in the bearing. It is generally difficult to detect this overheating due to the movement of the big end, and particularly in larger engines as used in marine applications or power generation.

According to one aspect of this invention there is provided an apparatus for determining a change in a condition in an item, the apparatus comprising a reactive means arranged to react to a change in a condition so as to move a detectable part in one of two directions dependent on the sense in which the condition changes, and a detection means arranged to sense the detectable part when in a predetermined proximal range, the reactive means being mountable on an item, such that when the condition is below a predetermined level the detectable part will be in a position to be sensed by the detection means, but when above the predetermined level the detectable part will not be detected by the detection means, or vice-versa.

In a preferred embodiment, the apparatus comprises a first member comprising the reactive means and a second member comprising the detection means, the first member being mountable on the item and the second member being mountable in a location spaced from the first member. In this embodiment, the detectable part constitutes a part of the first member, and movement of the reactive means moves the part towards or away from the detection means.

The reactive means may be thermally reactive, and preferably comprises an element of a material, and suitably a metallic material, which expands on heating and contracts on cooling. Alternatively, the thermally reactive means may comprise an element of a thermoplastic material which expands on heating. In such case, the expandable element would not contract on cooling, and is preferably replaceable after each expansion.

Where the thermally reactive means comprises an element of a metallic material, the element may be a bimetallic member, for example a bimetallic strip or a bimetallic washer which changes shape upon heating. Alternatively, the thermally reactive means may comprise an element in the form of a shape memory metal. Where the thermally reactive means comprises a bimetallic washer, the first member may comprise one or more domed bimetallic washers which flatten upon heating.

In a further embodiment, the thermally reactive means may comprise a housing containing a fluid which expands on heating. The housing may be provided with a piston adapted to be moved to the expanded condition on expansion of the fluid under the action of heat. Alternatively the housing may be expandable, and may be in the form of bellows.

In a still further embodiment the reactive means may comprise a thermally expandable fluid in a closed channel which channel is provided in a shaped member, such that a change in temperature causes a change in volume of the fluid which causes the shape of the member to change.

The channel may have a sensing portion, which may be spaced from the shaped member, which sensing portion is locatable at the location where conditions are to be monitored.

The shaped member may have a substantially S-shaped or C-shaped profile. The fluid in the channel preferably has a substantially linear thermal expansion, and may comprise xylene.

Alternatively or in addition, the reactive means may be reactive to pressure and may comprise a sprung member or housing in communication with an area where conditions are being monitored, such that increased pressure causes outward movement of the sprung member, or expansion of the housing.

The item may be capable of motion, and preferably rotational or reciprocal motion, such that reaction of the reactive means can bring the detectable part into or out of a detectable position intermittently, on each stroke of the reciprocating motion, or each rotation of the rotational motion. Alternatively, the item can be stationary such that reaction of the reactive means can bring the detectable part of the first member into or out of a continuously detectable position.

The first member may comprise resilient urging means acting against the reactive means. The use of the resilient urging means is particularly suitable when the item is capable of motion, particularly rotational or reciprocating motions, to prevent movement of the detectable part due solely to motion of the first member. The resilient urging means may be a spring, for example a compression spring.

The first member may comprise a securing portion enabling the first member to be secured to the item. The resilient urging means may be arranged in a space defined in the securing portion. The securing portion is preferably provided with a securing formation, e.g. a thread, cooperable with a corresponding formation on the item. Preferably, the securing portion is adapted to be screwed into a threaded core defined in the item.

The securing portion may define a space in which the resilient urging means is arranged. An elongate rod may extend through said space and is preferably attached to the reactive means towards one end thereof and also to the resilient urging means.

An iron containing member or a permanent magnetic member is preferably provided on the rod adjacent the one end thereof.

Alternatively, the reactive means may be mounted to a pivoted member on one side of the pivot with a equaliser member on the opposite side of the pivot, such that the reactive means causes pivoting of the member in response to a change in condition, but the equaliser member substantialy prevents pivotal movement of the member due to movement of the reactive means and/or the item as a whole.

The equaliser member may be arranged to substantially prevent pivotal movement of the member due to ambient temperature changes at the reactive means.

The equaliser member may be substantially physically equivalent to the reactive means to provide a substantially equal resistance to pivotal movement of the member.

Where the reactive means comprises a closed channel in a shaped member, the equaliser member may also incorporate a closed member, which may be filled with a fluid.

Where the reactive means comprises a metallic material element, the equaliser member may be arranged to operate in an opposite direction to the reactive means, to double the effect.

Preferably the equaliser member provides a substantially equal resistive force to the pivoted member as provided by the reactive means. Desirably the equaliser member has a substantially equal mass to the reactive means.

Alternatively, the equaliser member may have a different form to the reactive means.

A detectable part may be provided on the member on each side of the pivot.

The detection means may comprise any sensor suitable for sensing the proximity of an article, for example, a Hall effect sensor or a proximity switch, or a mechanical switch which may comprise a micro switch. The second member is preferably provided with a suitable formation to mount-the second member in the said location. The formations may be in the form of a thread.

The invention further-provides apparatus for detecting overheating-of a big end bearing in an internal combustion engine, the apparatus being according to any of the preceding twelve paragraphs.

Embodiments of the invention will now be described by way of example only and with reference to the accompanying drawings, in which.

Figure 1:
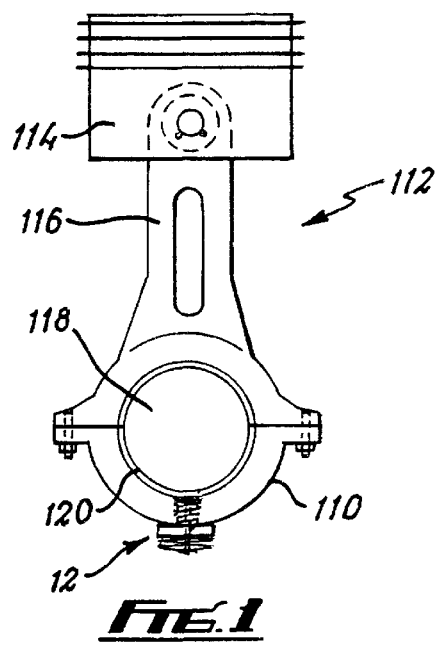
FIG. 1 is a schematic side view of a piston arrangement showing a big end having a first portion of a first apparatus according to the invention provided thereon.
Figure 2:
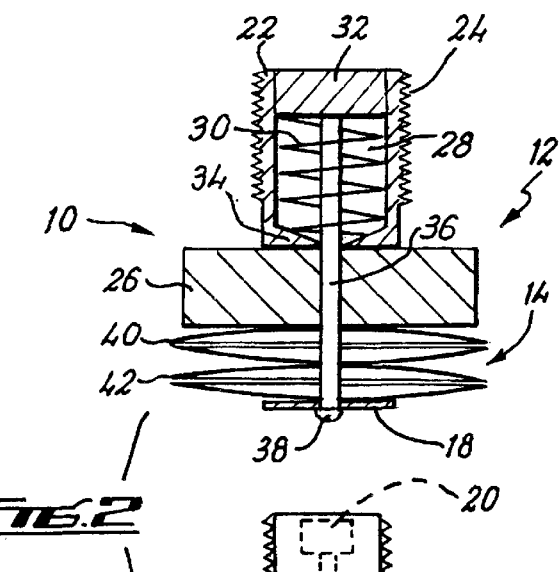
FIG. 2 is an enlarged diagrammatic side view of the apparatus of FIG. 1.

Referring to FIGS. 1 and 2 of the drawings, and particularly FIG. 2, there is shown apparatus 10 for detecting a temperature increase in an item, for example a big end bearing 120 of a piston arrangement 112 (see FIG. 1). The apparatus 10 comprises a first member 12 having a thermally reactive means 14, and a second member 16 arranged in a location spaced from the first member 12 such that heating of the first member 12 causes the reactive means to flatten thereby moving a portion of the first member 12, in the form of a ferrous washer 18 away from the second member 16. The second member 16 comprises a sensor which can detect the proximity of the washer 18. The sensor 20 may be a magnetic sensor arranged to detect the presence of ferrous materials, or a ferrous sensor arranged to detect magnetic materials.

Referring to FIG. 1, there is shown a piston arrangement 112 comprising a piston 114 attached to which is a connecting rod 116 having a crank shaft 118 passing through the big end 110 with a big end bearing 120. As can be seen, the first member 12 of the apparatus 10 is attached to the big end 110.

The first member 12 comprises a securing portion 22 provided with an external thread 24. The big end bearing 110 defines a bore provided with a corresponding thread to enable the securing portion 22 to be screwed into the bore in the big end bearing 110. The securing portion 22 is screwed into the big end bearing 110 until a disc member 26 abuts against the big end 110.

A space 28 is defined within the securing portion 22 between an inner wall 32 and outer wall 34, in which is arranged a compression spring 30. The inner wall 32 is slidably movable within the portion 22. An elongate rod 36 extends from the wall 32, through the reaction member 26 and the thermally reactive means 14, to an end member 38. A washer 18 is held between the end member 38 and the thermally reactive means 14. A spring 30 extends between the walls 32 and 34 to urge the washer 18 against the reactive means 14, i.e. upwardly as shown in the drawings, and against the centrifugal forces encountered during rotation.

The thermally reactive means 14 comprises a pair of domed bimetallic washers, 40, 42, such that when a predetermined temperature is reached, the bimetallic washers 40, 42 flatten out to the position shown in FIG. 2, such that the ferrous washer 18 moves towards the wall 32 under the force of the spring 30. This movement of the ferrous washer 18 pulls with it the end member 38, and the rod 36. When the first member 12 is cooled, the bimetallic washers return to a domed position and hence the washer 18 moves back away from the wall 32.

When the piston 112 is operating normally, the second member 16 which is located in the oil sump is arranged in line with the first member 12 such that the first member 12 moves directly towards and away from the second member 16, and during the stroke of the piston arrangement 112 the first member 12 is detected by the sensor 20. However, in the event that there should be overheating created for instance by friction between the crank shaft and the big end bearing 120 due perhaps to an oil loss, the bimetallic washers 40, 42 will flatten to move the ferrous washer 18 away from the sensor 20 such that it can no longer be detected.

The position of the second member 16 is so adjusted using mounting nuts 17, that in the case of such overheating of the big end bearing 120 and thus flattening of the bimetallic washers 40, 42, the ferrous washer 18 is brought out of the proximity of the sensor 20 so as no longer to be detected at the bottom of the stroke. A cable 44 extends from the sensor 20 to be attached to a suitable alarm and/or automatic cut off, such that when the sensor 20 no longer detects the proximity of the first washer 18, the alarm is sounded and/or the engine is automatically stopped.

Alternatively the cable 44 may connect with a signal conditioner which converts the intensity of the magnetic pulses to give a signal which can be arranged to give an indication of temperature, and/or other information such as wear conditions.

Thus, the invention provides a simple and effective way of automatically detecting overheating in the big end of an internal combustion engine. This could be of particular significance in marine applications or power generation. The invention is of relatively simple construction, and particularly the first member 12. It can thus be inexpensively and robustly manufactured and be usable in the harsh conditions encountered for example on a big end moving through an oil sump. The simple configuration also provides for reliable and consistent operation.

Figure 3:
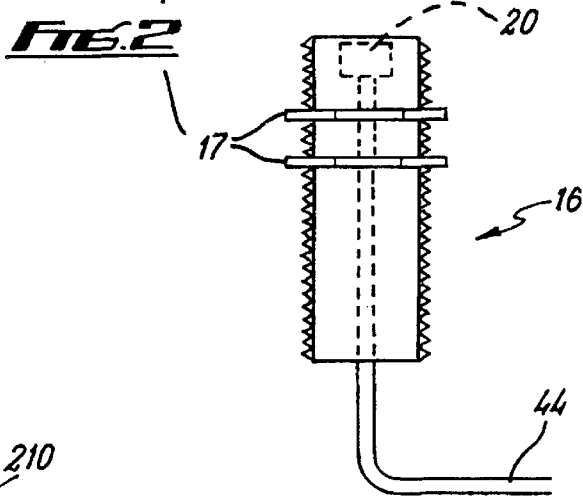
FIG. 3 is a similar view to FIG. 1 of a second apparatus according to the invention.
Figure 3:
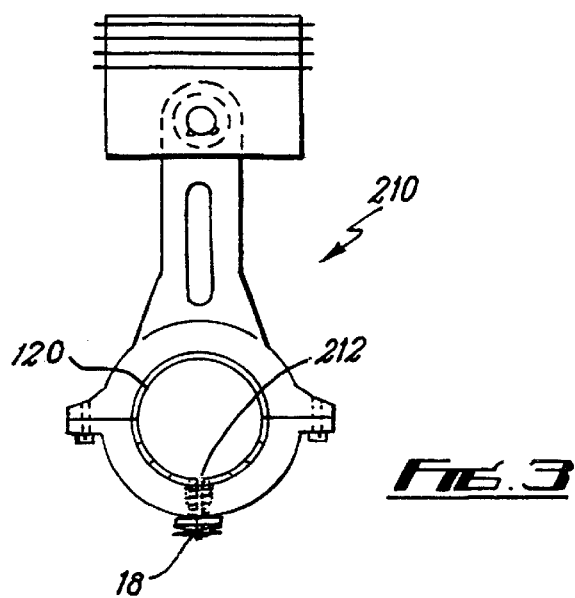

FIG. 3 shows a similar apparatus 210 except as indicated below. A port 212 is provided through the big end bearing 120, which port 212 communicates with the inner wall 32. The apparatus 210 is arranged such that in normal working conditions the oil pressure communicating through the port 212 will urge the wall 32 outwardly such that the washer 18 will be detected by the sensor 20. If a significant oil pressure drop occurs the wall 32 will move inwardly under the force of the spring 30 such that the washer 18 is no longer detected and the alarm or cut off will be actuated. This therefore provides a way of detecting both overheating and/or loss of oil pressure, both of which can prove very serious.

FIGS. 4 to 7 show different arrangements of a first member, all of which arrangements are intended to provide improved compensation at least in respect of the centrifugal forces experienced by virtue of rotation for example of a big end bearing.

Figure 4:
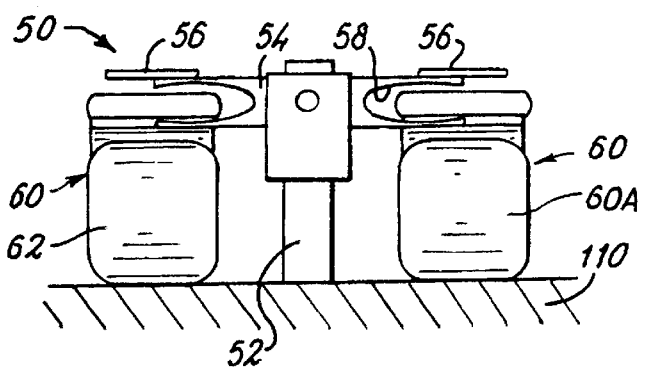
FIG. 4 is a diagrammatic end view of part of a third apparatus according to the invention.
Figure 5:
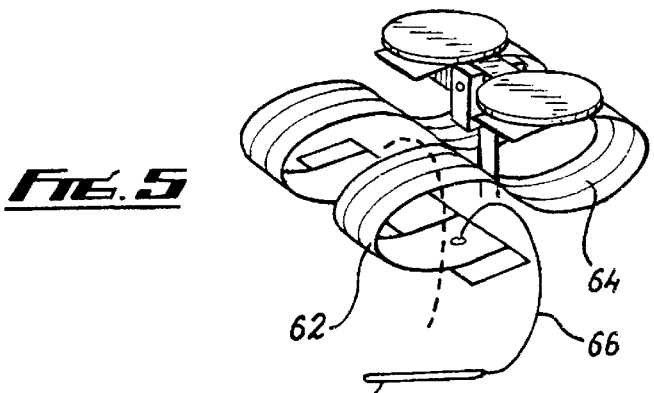
FIG. 5 is a diagrammatic perspective, view of part of the apparatus of FIG. 4.

FIG. 4 shows an arrangement 50 comprising a upstanding member 52 mountable on for example a big end 110. A cross piece 54 is pivotally centrally mounted to the upstanding member 52 to extend on either side thereof. Respective ferrous detectable members 56 are provided on the cross member 54 one on each side of the upstanding member 52. A recess 58 is provided in each end of the cross member 54, and each recess 58 locates an upper end of an S-shaped bourdon tube 60. Each tube 60 comprises an S-shaped strip 62 of metal, with a central passage 64 extending therethrough. At least the passage 64 of the active bourdon tube 60A is filled with a fluid with a substantially linear thermal expansion, which fluid in this instance in xylene.

A microbore capillary 66 extends from the passage 64 and in communication therewith, to a detector member 68. The non-active bourdon tube 60 may be filled with xylene, air, or may be open to atmosphere. The detector member 68 is locatable close to the bearing surface to provide an accurate reading, and a temperature change thereat will result in an expansion or contraction of the xylene and hence bending of the tube 60A. This will cause the cross member 54 to pivot relative to the member 62 thereby moving the detectable member 56 towards or away from a second member which could be in the form of a proximity sensor as described above. The balanced dual tube arrangement compensates for centrifugal forces acting on the arrangement 30 such that these are balanced out on either side of the upstanding member 52. Any vibration and also ambient temperature increase will also be balanced out in a similar way.

Figure 6:
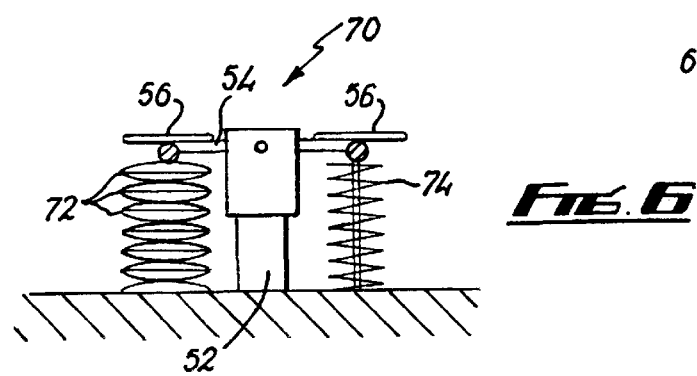
FIGS. 6 and 7 are similar views to FIG. 4 respectively of fourth and fifth apparatus according to the invention.

FIG. 6 shows a further balanced arrangement 70. In the arrangement 70 on one side of the upstanding member 52 a plurality of bi-metallic elements 72 are provided in a vertical column such that temperature changes will cause expansion or contraction and thus pivoting of the cross member 54 relative to the member 52. On the opposite side of the cross member 54 a non bi-metallic element such as a spring 74 is provided. The spring 74 has a similar mass to the bimetallic elements 72 and provides a similar resistive force to movement of the cross member 54.

Figure 7:
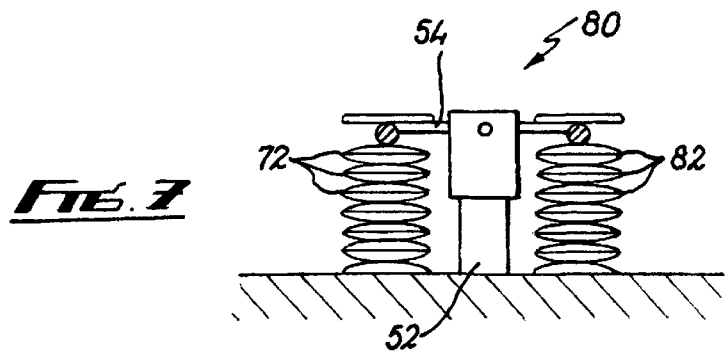

FIG. 7 shows a further arrangement 80 again with an upstanding member 52 and a cross member 54. In the arrangement 80 bi-metallic elements 72 are again provided on the left hand side as in the arrangement 70. In this instance however, further bi-metallic elements 82 are provided in a vertical column on the opposite side of the upstanding member 52. The elements 82 are arranged in an opposite orientation to the elements 72 such that as the elements 72 are caused to dome the elements 82 will flatten. This provides a magnified arrangement which helps to provide a compact arrangement.

The above three arrangements provide a relatively simple yet reliable temperature detection system. The system uses mechanical expansion/contraction to give a temperature/pressure indication using a distance detection arrangement.

Various other modifications can be made without departing from the scope of the invention. For example, the thermally reactive means may be differently formed and could operate in an opposite direction. They could comprise a different bimetallic member or members which could be in the form of a strip. Alternatively, a shape memory metal could be used. The thermally reactive means may be formed of a thermoplastic material such that once overheating has been detected, replacement of the reactive means will be required before detection ceases.

Further alternatives could include a housing containing a thermally expandable fluid, which fluid may impact against a piston when temperatures increase. The housing could be in the form of a bellows or the like which expands as the fluid contained therein expands. A different spring urging arrangement could be provided.

The apparatus could be differently positioned as conditions dictate. Such apparatus is usable in a wide range of different fields. The apparatus could be usable with fixed components and/or could be used to detect reductions in temperature. In certain instances the sensor part of the apparatus could comprise the thermally reactive means such that the sensor moves towards or away from a fixed item.

A Bourdon tube with a C-shaped profile could be used. A different material, which may not have a linear thermal expansion may be provided in the tube. The sensing portion of the tube may be arranged with a substantially thermally non expandable interior, comprising for instance, invar, to cause bending of the tube in an opposite direction.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A apparatus for determining a temperature change in an item, the apparatus comprising a thermally reactive means arranged to react to a change in temperature so as to move a detectable part in one of two directions dependent on the sense in which the temperature changes, and a detection means arranged to sense the detectable part when in a predetermined proximal range, the reactive means being mountable on an item, such that the detectable part is moveable by the reactive means relative to the detection means in response to temperature changes, wherein movement of the detectable part is detected by the detection means, characterized in that the reactive means comprises a thermally expandable fluid in a closed channel which channel is provided in a bent member, such that a change in temperature causes a change in volume of the fluid which causes the member to respectively either straighten or further bend.

2. An apparatus according to claim 1, characterized in that the item is capable of motion, and preferably rotational or reciprocal motion, such that reaction of the reactive means brings the detectable part into or out of a detectable position intermittently, on each stroke of the reciprocating motion, or each rotation of the rotational motion.

3. An apparatus according to claim 1, characterized in that the item is stationary such that reaction of the reactive means moves said detectable part within a continuously detectable position.

4. An apparatus according to claim 1, characterized in that the apparatus comprises a first member comprising the reactive means and a second member comprising the detection means, the first member being mountable on the item and the second member being mountable in a location spaced from the first member.

5. An apparatus according to claim 4, characterized in that the detectable part constitutes a part of the first member.

6. An apparatus according to claim 4 characterized in that the first member comprises a securing portion enabling the first member to be secured to the item.

7. An apparatus according to claim 1, characterized in that movement of the reactive means moves the detectable part towards or away from the detection means.

8. An apparatus according to claim 1, characterized in that the channel has a temperature sensing portion.

9. An apparatus according to claim 8, characterized in that the temperature sensing portion is spaced from the bent member.

10. An apparatus according to claim 8, characterized in that the temperature sensing portion is locatable at the location where conditions are to be monitored.

11. An apparatus according to claim 1, characterized in that the bent member has a substantially S-shaped or C-shaped profile.

12. An apparatus according to claim 1, characterized in that the fluid in the channel has a substantially linear thermal expansion.

13. An apparatus according to claim 1, characterized in that the thermally reactive means is mounted to a pivoted member on one side of the pivot with an equalizer member on the opposite side of the pivot, such that the thermally reactive means causes pivoting of the member in response to a change in temperature, but the equalizer member substantially prevents pivotal movement of the member due to movement of the thermally reactive means and/or the item as a whole.

14. An apparatus according to claim 13, characterized in that the equalizer member is arranged to substantially prevent pivotal movement of the member due to ambient temperature changes at the thermally reactive means.

15. An apparatus according to claim 13, characterized in that the equalizer member is substantially physically equivalent to the thermally reactive means to provide a substantially equal resistance to pivotal movement of the member.

16. An apparatus according to claim 13, characterized in that the equalizer also incorporates a closed channel filled with a fluid.

17. An apparatus according to claim 13, characterized in that the equalizer member is arranged to operate in an opposite direction to the thermally reactive means, to double the effect.

18. An apparatus according to claim 13, characterized in that a detectable part is provided on each side of the pivot.

19. An apparatus according to claim 1, characterized in that the detection means comprises a sensor suitable for sensing the proximity of an article.

20. An apparatus according to claim 19, characterized in that the sensor comprises a Hall effect sensor or a proximity switch.

21. An apparatus according to claim 1, characterized in that the apparatus includes a signal conditioner connected to the detection means, whereby signals emitted by the detection means on detecting the position of the detectable part can be conditioned by the signal conditioner to give an indication of temperature.

22. An apparatus according to claim 1, characterized in that the apparatus is arranged such that when the temperature is below a predetermined level the detectable part will be in a position to be sensed by the detection means, but when above the predetermined level the detectable part will not be detected by the detection means, or vice-versa.

23. An apparatus, according to claim 1, characterized in that the item is a big end bearing in an internal combustion engine wherein the apparatus detects overheating of the big end bearing.

24. An apparatus for determining a temperature change in an item, the apparatus comprising a thermally reactive means arranged to react to a change in temperature so as to move a detectable part in one of two directions dependent on the sense in which the temperature changes, and a detection means arranged to sense the detectable part when in a predetermined proximal range, the reactive means being mountable on an item, such that the detectable part is moveable by the reactive means relative to the detection means in response to temperature changes, wherein movement of the detectable part is detected by the detection means, characterized in that the reactive means is mounted to a pivoted member on one side of the pivot with an equalizer member on the opposite side of the pivot, such that the reactive means causes pivoting of the member in response to a change in condition, but the equalizer member substantially prevents pivotal movement of the member due to movement to the reactive means and/or the item as a whole.

25. An apparatus according to claim 24, characterized in that the equalizer member is substantially physically equivalent to the reactive means to provide a substantially equal resistance to pivotal movement of the member.

26. An apparatus according to claim 24, characterized in that the equalizer member is arranged to operate in an opposite direction to the reactive means, to double the effect.

27. An apparatus, according to claim 24, characterized in that the item is a big end bearing in an internal combustion engine wherein the apparatus detects overheating of the big end bearing.

\* \* \* \* \*